(12) United States Patent
Winger

(10) Patent No.: US 6,968,092 B1
(45) Date of Patent: Nov. 22, 2005

(54) SYSTEM AND METHOD FOR REDUCED CODEBOOK VECTOR QUANTIZATION

(75) Inventor: Lowell Winger, Waterloo (CA)

(73) Assignee: Cisco Systems Canada Co., Halifax (CA)

(\*) Notice: Subject to any disclaimer, the term of this patent is extended or adjusted under 35 U.S.C. 154(b) by 743 days.

(21) Appl. No.: 09/934,992

(22) Filed: Aug. 21, 2001

(51) Int. Cl.$^7$ ............................................. G06K 9/36
(52) U.S. Cl. .................................. 382/253; 375/240.22
(58) Field of Search ............................... 382/232, 233, 382/253, 166, 248, 224, 288, 225; 704/222; 375/240.03, 240.22, 240.18–240.21

(56) References Cited

U.S. PATENT DOCUMENTS

| | | | | |
|---|---|---|---|---|
| 5,521,988 A | * | 5/1996 | Li et al. ...................... | 382/248 |
| 5,802,208 A | * | 9/1998 | Podilchuk et al. .......... | 382/224 |
| 5,822,452 A | * | 10/1998 | Tarolli et al. ................ | 382/166 |
| 5,890,110 A | * | 3/1999 | Gersho et al. .............. | 704/222 |

OTHER PUBLICATIONS

Winger, Linearly constrained generalized Lloyd algorithm for reduced codebook vector quantization, IEEE ISSN: 1053-587X, 1501-1509.*

Lee et al., Modified k-mean algorithm for vector quantizer dessign, IEEE ISSN: 1070-9908, 1-3.*

S. Lloyd, "Least Squares Quantization in PCM". IEEE Trans. Info. Theory, IT-28, pp. 129-137, Mar. 1982. (Reprint of unpublished Bell Laboratories Note, Sep. 1957).

Y. Linde, A. Buzo, R. Gray. "An Algorithm for Vector Quantizer Design". IEEE Trans. On Comm., 28(1), pp. 84-95, Jan. 1980.

A. Gersho, R. Gray, Vector Quantization and Signal Compression, Kluwer Academic Publishers, Boston, 1992, pp 362-369.

3DFX Interactive Inc., "FX1 Whitepaper". Available at http://www.reactorcritical.com/white-3dfx-fxt1/white-3dfx-fxt1.shtml, downloaded on Aug. 15, 2001.

E. Delp, O. Mitchell, "Image Compression Using Block Truncation Coding", IEEE Trans. On Comm., 27(9), pp 1335-1342, 1979.

M. Athans, "Gradient Matrices and Matrix Calculations", M.I.T. Lincoln Lab, Lexington, Tech. Note 1965-53, Nov. 1965.

A. Jain, Fundamentals of Digital Image Processing, Prentice-Hall, London, 1989, pp. 104-111, 116.

P. Simard, Y. Le Cun, and J. Denker, "Efficient Pattern Recognition Using a New Transformation Distance", Giles, Hanson, Cowan, editors, in Advances in Neural Information Processing Systems, vol. 5, Morgan Kaufmann Publishers, 1993.

R. Duda, P. Hart, Pattern Classification and Scene Analysis, John Wiley & Sons, New York, 1973, pp 225-228.

\* cited by examiner

*Primary Examiner*—Amelia M. Au
*Assistant Examiner*—Ishrat Sherali
(74) *Attorney, Agent, or Firm*—Beyer Weaver & Thomas LLP

(57) ABSTRACT

The present invention extends the generalized Lloyd algorithm (GLA) for vector quantizer (VQ) codebook improvement and codebook design to a new linearly-constrained generalized Lloyd algorithm (LCGLA). The LCGLA improves the quality of VQ codebooks, by forming the codebooks from linear combinations of a reduced set of base codevectors. The present invention enables a principled approach for compressing texture images in formats compatible with various industry standards. New, more flexible compressed texture image formats are also made possible with the present invention. The present invention enhances signal compression by improving traditional VQ approaches through the integrated application of linear constraints on the multiple pattern and signal prototypes that represent a single pattern or block of signal samples.

19 Claims, 6 Drawing Sheets

SYSTEM AND METHOD FOR REDUCED CODEBOOK VECTOR QUANTIZATION

FIELD OF THE INVENTION

The present invention relates generally to the field of signal processing, more particularly to the field of vector quantization as applied to lossy signal compression.

BACKGROUND OF THE INVENTION

Although the present invention may be directed toward any number of signal compression areas, to aid the reader in understanding the present invention, we refer to a single area by way of example. This example being the compression of data that adds texture to a digital image.

Conventional graphics systems such those as found in personal computers and home video game computers, use a frame buffer to store all the graphic data information that will be displayed on the computer screen. A graphics engine must "render" or draw graphics information into the frame buffer. Textures such as bumps, scratches, and surface features were not modeled by early graphics rendering engines. Rather, extremely smooth surfaces were constructed over a framework of graphics primitives such as polygons and vectors. Current graphics engines map textures onto these surfaces to replace artificially smooth surfaces with realistic detail. Examples of a texture of an object include the grass on a lawn, or the skin-tone variations and wrinkles on a human face.

A texture map is comprised of texels (texture elements) that are stored in texture memory. Texture memory is a scarce resource, so in order to efficiently use it, the digital signal representing the texture map is often compressed with a fixed compression ratio.

U.S. Pat. No. 5,822,452 discloses a method and system for "compressing and decompressing a texture image". This method and various obvious improvements and modifications have been widely studied and adopted. The method is the following: a compression color space is selected either manually or using a neural network, each texel in the texture image is converted to an 8-bit value in the selected color space, and a decompression table is generated that represents the RGB values for each texel stored in the selected color space. When rendering a pixel representing an object with a texture, the texture image is mapped to the representation of the object, and one or more texels that are associated with each pixel are decompressed.

The inventors in U.S. Pat. No. 5,822,452 go to great lengths to describe their neural network algorithm for selecting the compression color space. In fact, this method is an ad hoc, heuristic, and sub-optimal example of a gradient descent method. Neural networks are frequently found to produce performance that may be superior to random guessing for poorly characterized and/or mathematically intractable optimization problems. The neural network as disclosed operates by iteratively modifying the choice of color space such that for each individual texel value, in turn, the distortion is lowered. However, lowering the distortion for a particular input may raise the distortion for the rest of the inputs leading to a net overall increase in distortion. In practice, more often than not, by using ad hoc techniques such as these, supplemented with user intervention to tune various optimization parameters, acceptable performance may be realized, but with much greater effort, both computational and human, than what may be possible with a principled approach.

Although the above referenced prior art patent deals specifically with the compression of color spaces, there is a more general need for a simple improved method of optimally compressing digital signals. In other words, an improvement to manual, neural network, and other ad hoc approaches. The present invention addresses this need.

SUMMARY OF THE INVENTION

The present invention relates to a system and method for utilizing a modified LCVQ algorithm to produce optimal codebooks for use in minimizing the content required in a digitized data stream.

One aspect of the present invention is a modified LCVQ method for creating an optimal codebook; the method having the steps of:
a) initializing a base codebook B with a set of base codevectors;
b) finding the nearest neighbour for each source vector in a block of data and associating each source vector with a base codevector in the base codebook B;
c) creating codebook C based upon the formula, C=B*W;
d) updating the base codebook B utilizing the following formula:

$$B = SW^T * \text{inverse}(WNW^T); \text{ and}$$

e) repeating steps b) to d) until the base codevectors in base codebook B have converged.

In another aspect of the present invention, there is provided a computer system for creating optimal codebooks, the system having:
a) a general purpose computer;
b) memory connected to said general purpose computer;
c) a compression module resident in memory b); where the compression module comprises;
  i) an initialization module for calculating initial values for a base codebook B, the initialization values being source vectors from a block of data;
  ii) a nearest neighbour module, the nearest neighbour module accepting base codebook B as input from the initialization module and assigning each source vector in the data block to a vector in base codebook B; and calculating a codebook C based upon the values in base codebook B;
  iii) a centroid module, the centroid module recalculating the values contained in base codebook B to improve convergence;
  iv) a convergence module, said convergence module determining if the centroid module has converged the values in base codebook B; and
d) a graphics engine connected to the compression module.

In another aspect of the present invention there is provided a system for creating an optimal codebook; the system having:
a) means for initializing a base codebook B;
b) means for creating a codebook C from base codebook B;
c) means for recalculating base codebook B; and
d) means for determining if the contents of base codebook B have converged.

In yet another aspect of the present invention, there is provided a computer readable medium containing instructions for creating an optimal codebook; the instructions having the steps of:
a) initializing a base codebook B;
b) finding the nearest neighbour for each source vector in a block of data and associating each source vector with a codevector in base codebook B;

c) creating a codebook C based upon the formula, $C = B*W$;

d) updating base codebook B utilizing the following formula:

$B = SW^T * inverse(WNW^T)$; and e) repeating steps b) to d) until the values in base codebook B have converged.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE PREFERRED EMBODIMENTS

The present invention is directed toward a system and method of compressing image signals. Vector quantization is commonly used to compress image signals. Vector quantization takes as input a set of source vectors and calculates a smaller set of codevectors. These codevectors are then stored in a codebook. To better illustrate this concept, we refer now to FIG. 1.

Figure 1:
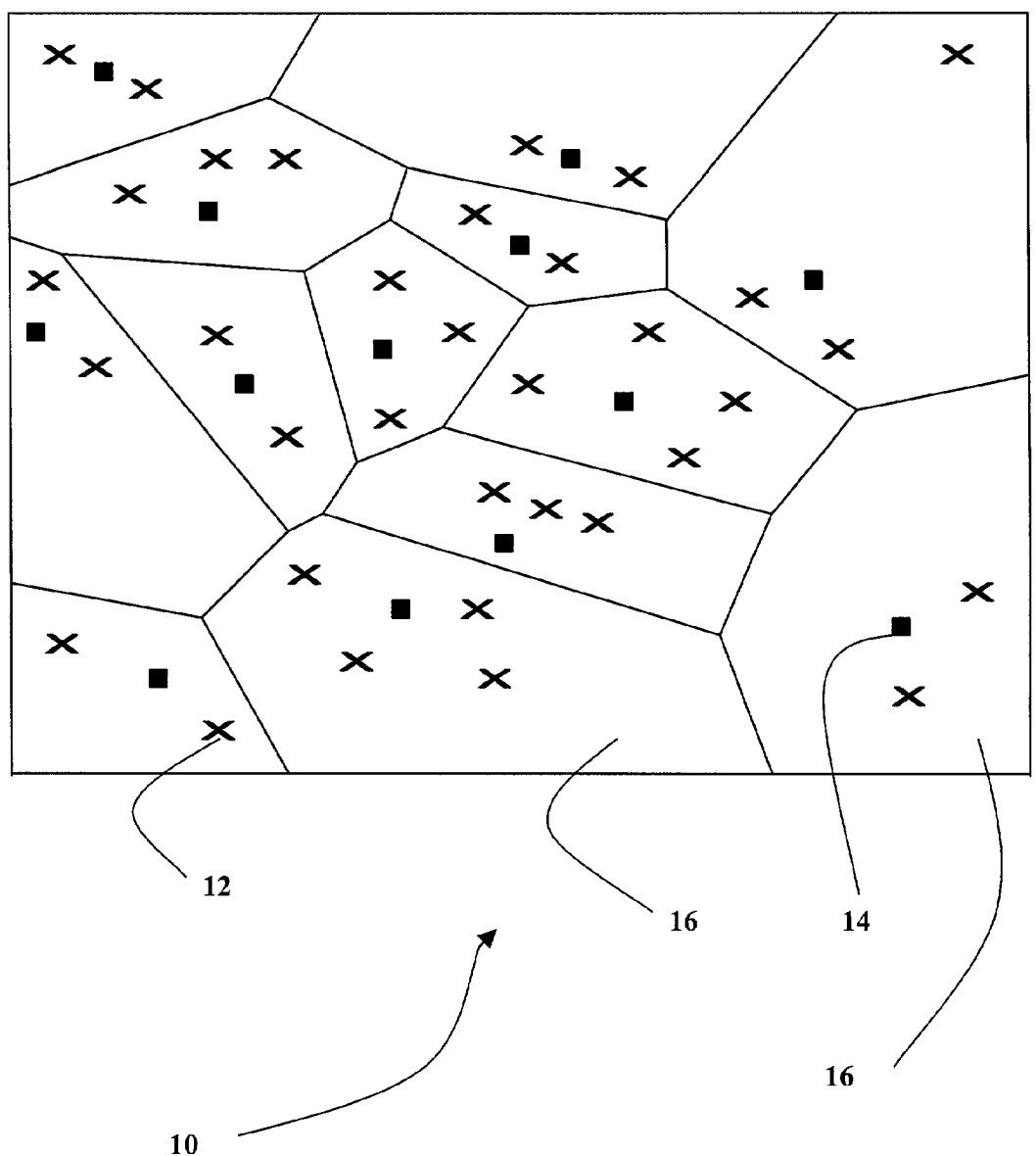
FIG. 1 is a plan view of a set of source vectors and codevectors in a two dimensional space.

FIG. 1 is a plan view of a set of source vectors and codevectors in a two dimensional space shown generally as 10. Source vectors 12 are represented by an "x" and codevectors 14 are represented by a solid block in FIG. 1. The two dimensional space 10 has been divided into a number of Voronoi regions 16, by a process well known in the art. Each region 16 will have a single codevector 14 which is stored in a codebook (FIG. 2). Codevector 14 is the nearest neighbour to the source vectors 12 contained within a region 16. The present invention is directed toward the determination of a set of optimal codevectors 14. For the purposes of this disclosure, space 10 is considered to be an 8×8 block of source vectors representing pixels or texels. As such, one would expect space 10 to contain 64 source vectors. As can be seen from FIG. 1 this is not the case as including 64 source vectors would have made FIG. 1 somewhat "busy". Further, it is not the intent of the inventors to absolutely require space 10 to be 8×8. In the preferred embodiment it is 8×8, however, it may be any dimension deemed by the implementer to be the most efficient size for the implementers use of the present invention.

Figure 2A:
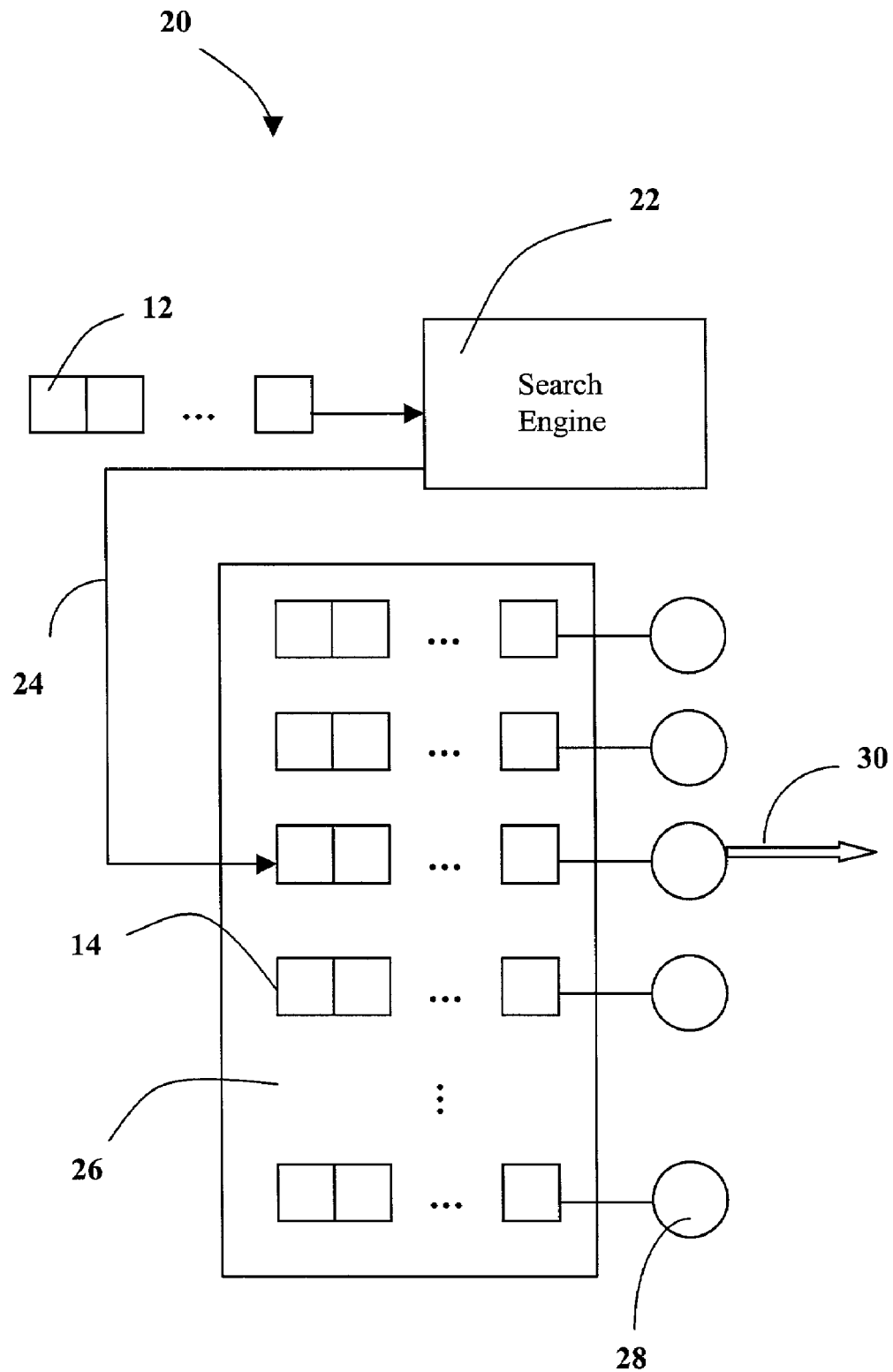
FIG. 2a is a block diagram of an encoder.

FIG. 2a is a block diagram of an encoder shown generally as 20. Encoder 20 comprises search engine 22 and codebook 26. Codebook 26 comprises a plurality of codevectors 14. Search engine 22 accepts as input source vector 12 and searches for the codevector 14 that is the nearest neighbour to source vector 12 in codebook 26. Link 24 illustrates a link to the nearest neighbour vector located by search engine 22, i.e. a codevector 14. Each codevector 14 in codebook 26 has a corresponding index 28. Once search engine 22 has located the appropriate codevector 14, encoder 20 outputs via communication channel 30 the index 28 for the codevector 14. Only the index is passed, not the entire vector, this reduces bandwidth on channel 30.

Figure 2B:
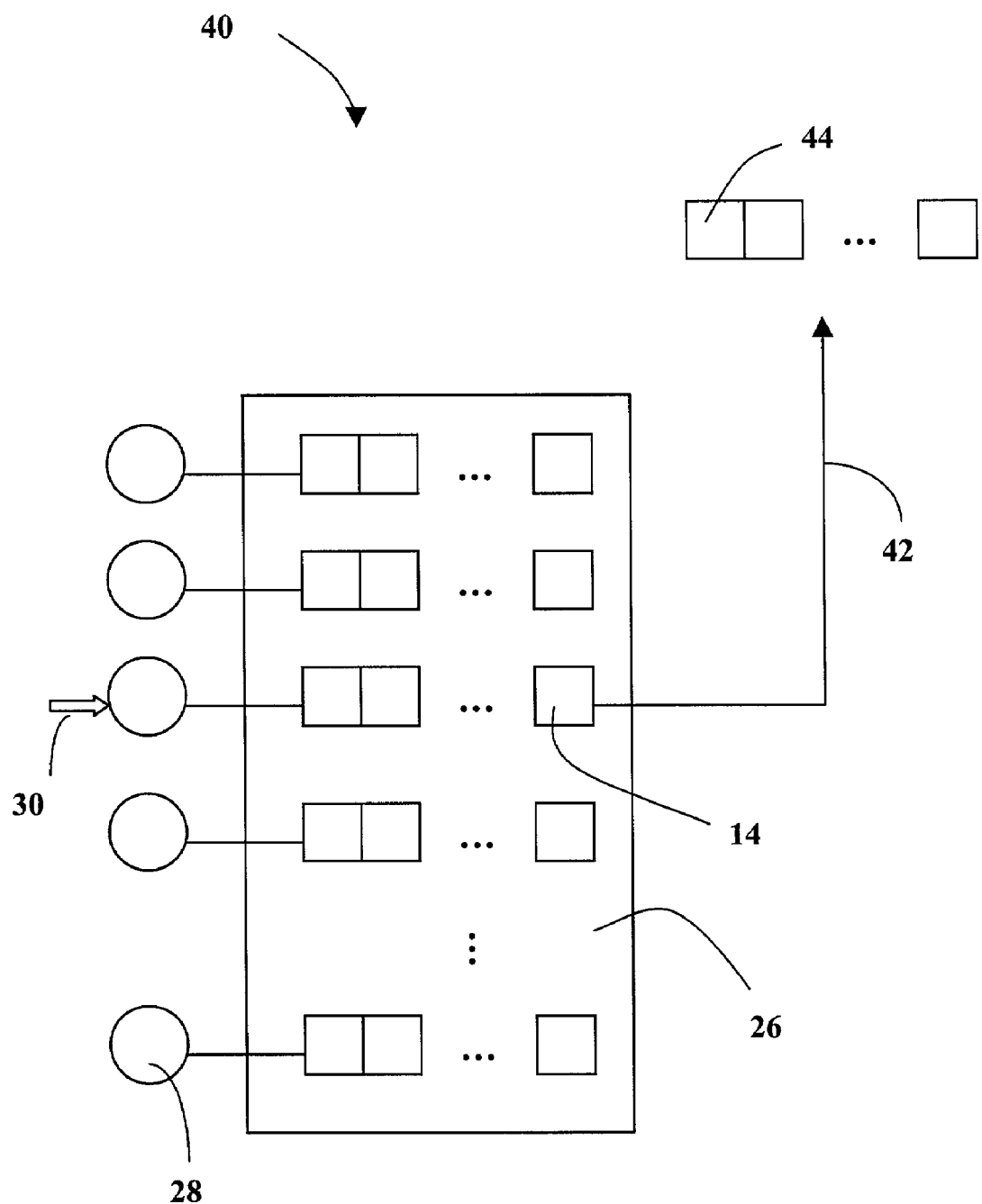
FIG. 2b is a block diagram of a decoder.

Referring now to FIG. 2b, a diagram of a decoder is shown generally as 40. Decoder 40 takes as input an index 28 passed on channel 30 by encoder 20. Index 28 is then used to locate the corresponding codevector 14 in codebook 26. Codevector 14 is output via link 42 as output vector 44.

We will now discuss in general the concepts of compression and the specific method used by the present invention.

Effectiveness of any lossy compression technique can be measured in terms of the distortion introduced in order to obtain a required compression ratio. The distortion can be expressed in terms of the square difference between corresponding original and decompressed pixels averaged over the image (i.e., mean squared error for which less is better). The compression ratio (more is better) is the number of bits in the input divided by the number of bits in the compressed code that is the output of the compression apparatus. Ideally compression would be achieved with zero distortion (no loss). Lossless compression techniques introducing no distortion do exist. For typical inputs these methods will achieve modest compression ratios on average. However, for any lossless technique it is possible to find an input that will result in zero-compression, or even expansion of the signal. It is well known in the art that a truly random input is not compressible without loss. For this reason, when a fixed or minimum compression ratio must be consistently achieved, only lossy techniques are applicable.

A conventional example of lossy compression is to replace each 8-bits of each color component of a vector value that was in a red-green-blue (RGB) color space (RGB888) with a number of its most significant bits (MSBs) in a reduced color space (e.g., RGB565). That is, a 24-bit value is compressed in a 3:2 ratio by replacement with a 16-bit value, by reducing the number of bits to 5-bits of red, 6-bits of green, and 5-bits of blue. To achieve a 3:1 compression ratio RGB332 could, theoretically, be used, but practically the decompressed image quality is much too poor when the data is reduced in this straightforward manner.

Recent methods achieve acceptable visual quality with high compression ratios (e.g, 6:1). One broadly used technique is a linearly-constrained vector quantization (LCVQ) representation of blocks of vectors.

In a vector quantizer, lossy compression is introduced by representing vectors with a reduced number of codevectors that introduce only an almost imperceptible distortion when replacing the original vectors. That is, each vector in a block of T vectors (e.g., T=16 vectors in a 4×4 block from the texture image) is represented by M possible Y-bit codevectors (e.g., M=4, Y=2) such that a 2-bits look-up table index is required to specify which codevector is used to represent a given vector. Linearly-constrained VQ places the restriction on these M codevectors that they must be formed from a simple linear combination of a much smaller set of L base codevectors (e.g., L=2). For example, a codevector C1 may be constructed from two base codevectors through a linear construction such as:

$C1 = 0.5*B1 + 0.3*B2 + 0.2*B3$

The above referenced linear equation is illustrative only, as the dimension of base codevectors may be greater than three and the weights for each dimension of B will vary.

This restriction is motivated by the fact that the complete compressed representation of each block of T vectors requires two sets of information: a block specific set of base codevectors, and T individual indices. Each of the T vectors in a block is represented by a Y-bit index specifying their representative codevector from the matrix C. Since the L base codevectors that form the base codevector matrix B are also unique for each block of T vectors, these base codevectors also form part of the compressed representation of the block. This flexibility allows the codevectors to adapt to colors present in each unique image block. For example, if L=2 and the base codevectors are stored in RGB565 format then each block requires two 16-bit base codevectors and 16 2-bit indices, for a total of 64-bits (4-bits per vector). This compression ratio is therefore twice that of the method described in U.S. Pat. No. 5,822,452, which requires 8-bits per vector.

We will now describe a principled, mathematical description of an LCVQ representation of a block of a texture image. Let X be a D row by T column matrix. For the example of texel compression, D=3 is the number of components in each texel/vector, thus D represents the three values of RGB for each texel/vector. The value T is the number of vectors in an image block I, each vector in that block forms one column of X. Let C be a D row by M column matrix containing the current codevectors for block I. Let N be a M by M diagonal matrix with the number of vectors in block I which are closest to each codevector (i.e. produce the least mse distortion and therefore assigned to that codevector) in matrix C appearing along the diagonal in the corresponding column of matrix N. Let S be a D by M matrix where each column contains the sum of the vectors currently assigned to each codevector. Let B be a D by L matrix where each column contains the current base codevectors for block I, such that C=BW is found by matrix multiplication with a fixed L by M weight matrix that specifies what proportion of each base codevector is used to form the current codevectors that represent the vectors.

For an example of present art, the mixed LCVQ format of S3 Inc., of Santa Clara, Calif. uses T=16=4×4, L=2, M=4, and RGB=565 for the base codevectors. This is one of the most widely accepted formats used for texture compression for 3D graphics. Each subblock of 4×4 pixels is coded with a four entry codebook (2 bits per pixel), where two of the entries are derived by linear interpolation from the two base codevectors that are quantized in 565 format. The red, green, and blue (RGB) channels are quantized to five, six, and five bits respectively.

As a further example of present art, the high LCVQ format utilized by 3dfx Interactive Inc., of Alviso, Calif., uses T=32=4×8, L=2, M=8, and RGB=565 for the base codevectors. Each subblock of 4×8 pixels is coded with eight codevectors (3 bits) derived by linear interpolation from two base codevectors that are quantized in 565 format.

Finally, the chroma LCVQ format of 3dfx uses T=32=4×8, L=M=4, and RGB=565 for the base codevectors. Each subblock of 4×8 pixels is coded with four codevectors (2 bits) that are stored in 565 format. This accommodates complex color regions; however, since no codevectors are derived, it is a block VQ rather than block LCVQ format (the weight matrix is the identity matrix).

The problem with these 3 examples of prior art is that:
1) For blocks with very complex color (having more than 8 visibly distinct colors) M is too small. In particular, steep color gradients arising from the gradual linear blending of one color with another quite distinct color are not rendered as well as would be possible with a larger M.

2) To obtain the flexibility of M=8 (a larger number of distinct colors in a texture/image block), it is necessary that all colors in a block be obtainable from linear interpolation of two base colors. While this model works well for color gradients, complex color textures rarely follow this model. That is, in the prior art the derived colors (codevectors) are constrained to lie along a line in the 3D (RGB) color space. We would like 2D and 3D linearly constrained models that allow the derived colors to either lie along a plane in the color space, or to occupy the 3D volume of the colorspace respectively.

Thus, the present invention is directed toward finding an improved system for finding a superior base codebook B for each block of vectors of a texture image. The present invention makes use of a general algorithm that is computationally scalable, and that guarantees convergence towards a minimum distortion compressed representation for the wide class of signal compression techniques that use "linearly-constrained vector quantization" (LCVQ).

Given this framework, the generalized Lloyd algorithm (GLA/LBG) may be fundamentally modified and extended to a new algorithm that has similar properties to what the original GLA/LBG has for unconstrained vector quantization. The new linearly-constrained generalized Lloyd algorithm (LCGLA) has two steps:

1) Find the nearest neighbour: each vector is assigned to its nearest codevector in C.
2) Centroid: the base codevector matrix B is updated with the following formulae:

$$B = SW^T * \text{inverse}(WNW^T)$$

$$C = BW$$

Furthermore, by limiting the number of iterations of these two steps that are performed, it is possible to limit the computational complexity of the algorithm to a fixed quantity—making it suitable for hardware implementation. (i.e. the method is computationally scalable).

The present invention works with both two-dimensional and three-dimensional LCVQ codebooks.

The present invention provides LCVQ formats that are more effective than those used in the present art in which linear interpolation of base codevectors to form the codebook C is the sole technique. Also, a larger block size of 8×8 is proposed rather than a block size of 4×4 or 4×8 such that more distinct colors are possible within a block. Three such formats are the following:

1) 1D LCVQ (T=64=8×8, L=2, M=11, RGB=565). A single block of 8×8 pixels uses less than 3.5 bits per pixel for choosing the color of each pixel, and 0.5 bit per pixel for representing the base codevectors. This format is ideal for high quality representation of steep color gradients, as commonly results in obvious artifacts representing such textures as "sky" and "water" with the prior art. A steep color gradient would be a gradual change from [0,0,0] to [255,255,255] within one 8×8 block. For example, white at the left side of the block, black at the right side of the block and different levels of gray in between. Another example would be a gradual change from red [255,0,0] to blue [0,0,255] or from any two colors that are widely separated in their [r,g,b] representation.

A block of 8×8 pixels would use a weigh matrix of two rows namely:
Row 1)1, (k−1)/k, (k−2)/k, . . . 0
Row 2)0, 1/k, 2/k, . . . 0 where k is typically 3 or 7 and the number of columns in the weight matrix W is k+1 such that there are 2 base vectors in B and (k+1) derived vectors in codebook C.

2) 2D (T=64=8×8, L=3, M=8, RGB=777). A block of 8×8 pixels uses the weight matrix $$W = \begin{bmatrix} 1 & 0 & .25 & -.25 & 1 & -1 & 0 & -1 \\ 0 & 1 & .25 & -.25 & -1 & 1 & -1 & 0 \\ 0 & 0 & .5 & 1.5 & 1 & 1 & 2 & 2 \end{bmatrix}$$

With this example, colors are no-longer constrained to lie along a line between two base colors, but are constrained to lie in the plane defined by three base-colors. An obvious example when this format will outperform prior art is a color gradient in which three colors are mixed.

3) 3D (T=64=8×8, L=4, M=8, RGB=565): A block of 8×8 pixels uses the weight matrix $$W = \begin{bmatrix} 8 & 0 & 0 & 1 & 1 & 3 & 4 \\ 0 & 8 & 0 & 3 & 4 & 4 & 1 \\ 0 & 0 & 8 & 4 & 3 & 1 & 3 \end{bmatrix} / 8$$

With this format, colors in the derived codebook C fill the entire volume of RGB colorspace. An obvious example when this sort of flexibility is required is a highly colorful texture such as small, colorful beads. The S3 Inc. mixed format also has this property that colors are not constrained to a plane or line in the 3D colorspace, but to obtain this property it limits the number of colors in a block to M=4. By using this 3D LCVQ format we obtain this same property while allowing M=8, eight distinct colors in each block.

The only restriction on a weight matrix W is that it be non-singular. In other words, there are many different possible matrices that may be used instead of the ones suggest above by the inventor. For example, one efficient method of utilizing the present invention may be to pick a set of different weight matrices W that provide good distortion performance for representing certain types of images and allow one of the set to be used for each block, as specified on a block by block basis.

In summary, when quantizing a texture image, the image is partitioned into non-overlapping blocks of 8×8 vectors/pixels. These blocks are compressed, communicated, and decompressed in conventional raster-scan top-left to bottom-right order. Within each 8×8 block, the vector/pixels themselves are also represented in conventional raster-scan top-left to bottom-right order by an index which indicates what codevector is used to represent each vector. The base codevectors (B) themselves are present in the compressed representation of each block and are transmitted via channel 28 (see FIGS. 1 and 2). The matrix W is stored in both the encoder 20 and decoder 40. Thus, through the use of fixed matrix W and dynamic matrix B, the codevectors in codebook 26 (i.e. matrix C) are dynamically derived by matrix multiplication. By transmitting B, bandwidth is saved by not requiring the transmission of C. In addition, as discussed earlier, a number of matrices W may be employed by both the encoder and the decoder and an optimal matrix W selected for each individual block.

Figure 3:
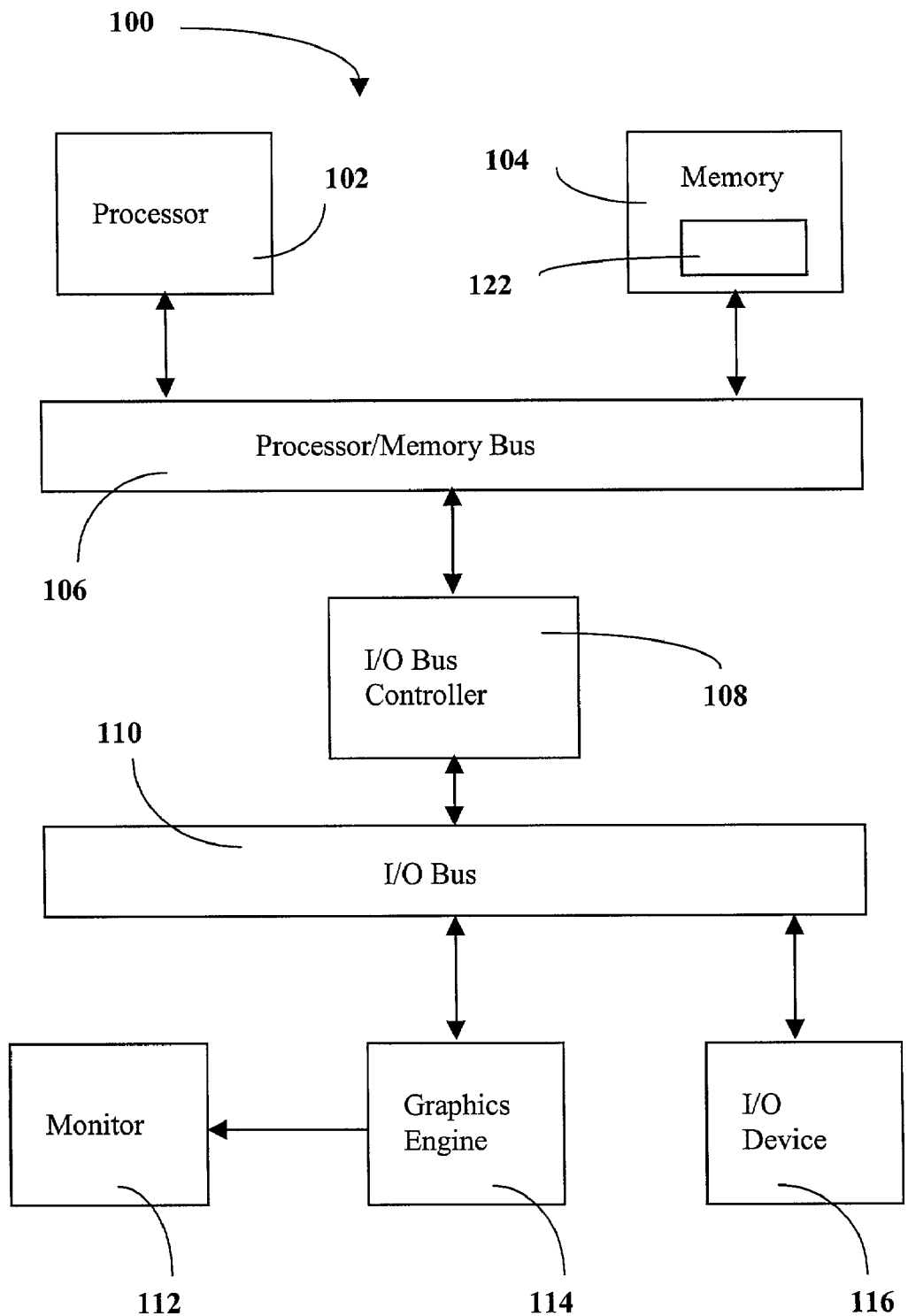
FIG. 3 is a block diagram of a computer system in which the present invention operates.

Referring now to FIG. 3 a block diagram of a computer system in which the present invention operates is shown generally as 100. In the preferred embodiment, the computer system 100 is a conventional personal computer such as an IBM compatible PC with a conventional DirectX 5.0 (or later) compatible graphics engine 114, and a non-conventional compression module 122 stored in conventional random access memory 104.

DirectX is a suite of multimedia application programming interfaces provided by Microsoft Corporation. DirectX provides a standard development platform for Windows-based PCs by enabling software developers to access specialized hardware features without having to write hardware-specific code.

Processor 102 of computer system 100 is a processor, capable of running the DirectX functions, such as a Pentium series processor commercially available from Intel Corp. Processor/memory bus 106 and I/O (input/output) bus 110 are conventional. A conventional I/O bus controller 108 controls the data flow between I/O bus 110 and processor/memory bus 106. Conventional I/O devices 116, such as a keyboard and disk drive, are connected to I/O bus 110. A conventional computer monitor 112 is driven by the graphics engine unit 114.

For an embodiment in which the graphics engine 114 is non-conventional, texture data is communicated across processor/memory Bus 106, I/O Bus Controller 108 and I/O Bus 110 from compression module 122 to graphics engine 114 in at least one of the following non-conventional formats for each block of 8×8 pixels from the original texture image:

1) 1D:
   (11 codevectors are derived from the base codevectors)
   base codevector 1: 5-bits red, 6-bits green, 5-bits blue
   base codevector 2: 5-bits red, 6-bits green, 5-bits blue
   32 seven bit indices: each index (ranging from 1 to 121) indicates for two adjacent source vectors, which codevectors (between 1 and 11) they are represented by. The forward and backward mapping from a paired index to individual indices is given as:
   vectorAindex=floor[PairedIndex/11]
   vectorBindex=mod(PairdIndex−1, 11)+1
   PairedIndex=vectorAindex*vectorBindex In this way, the index for each individual source vector is represented in 3.5 bits. The fractional bit representation is made possible by pairing each vector with one other vector. In other words, with 64 source vectors there are 32 pairs of source vectors represented by 32 seven bit indices.

2) 2D: a total of 255-bits
   (8 codevectors are derived from the base codevectors)
   base codevector 1: 7-bits red, 7-bits green, 7-bits blue
   base codevector 2: 7-bits red, 7-bits green, 7-bits blue
   base codevector 3: 7-bits red, 7-bits green, 7-bits blue
   64 3-bit indexes: each index indicates which codevector represents an individual vector.

3) 3D: a total of 256-bits
   (8 codevectors are derived from the base codevectors)
   base codevector 1: 5-bits red, 6-bits green, 5-bits blue
   base codevector 2: 5-bits red, 6-bits green, 5-bits blue
   base codevector 3: 5-bits red, 6-bits green, 5-bits blue
   base codevector 4: 5-bits red, 6-bits green, 5-bits blue
   64 3-bit indexes: each index indicates which codevector represents an individual vector.

The pseudo code required to implement the preferred embodiment of compression module 122 is provided in Appendix 1 in Matlab format. The two algorithms, which may be written in any computing language, are used to encode each image block. The routine "Initcluster" is used to find a random initial base codebook B given an 8×8 block of 64 vectors that are the columns of the matrix X. The routine "lgbo". iteratively improves any codebook B using the unconventional LCGLA algorithm, which is a modified version of the convention generalized Lloyd algorithm that functions for linearly constrained codebooks C.

Figure 4:
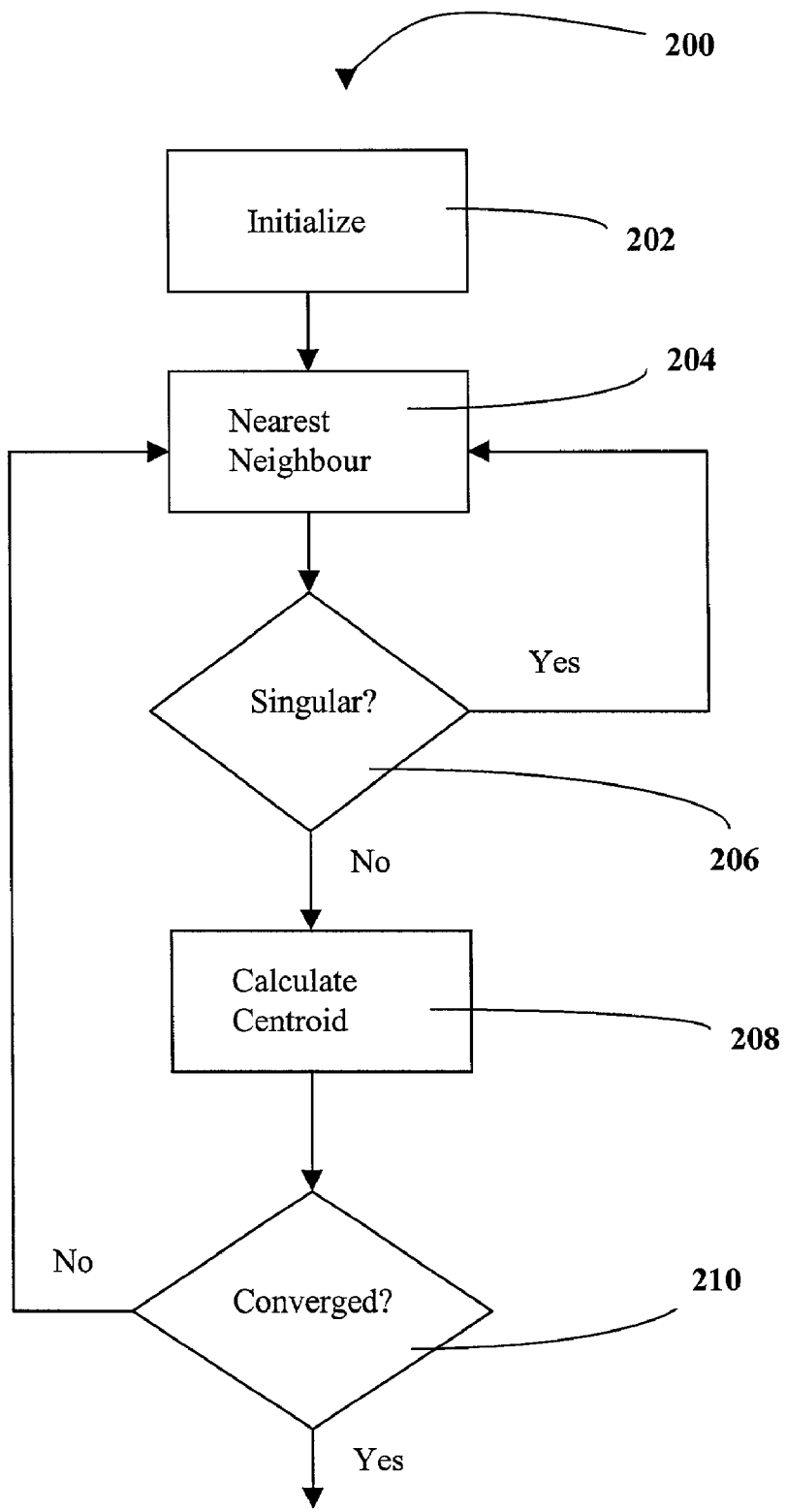
FIG. 4 is a flow chart illustrating the logical components of the present invention.

FIG. 4 is a flow chart of the logical components of the present invention, shown generally as 200. The following description provides an overview of the logical components of FIG. 4. For specific implementation details, we refer the reader to Appendix 1. At step 202 the matrix B is randomly initialized without replacement from the 64 source vectors contained in the current 8×8 block of data (i.e. the space 10 of FIG. 1). This initialization step is known in the art and many others exist. It is the intent of the inventors that any form of initialization may be utilized when practicing the present invention. At step 204 the value of matrix C is set to:

$$C=B*W;$$

Matrix B is modified so that each vector in B is a "nearest neighbour" to the source vectors. This step locates the Voronoi regions of the codevectors. Then each of the 64 source vectors are assigned to their nearest neighbour codevector in codebook C.

Should the result of the creation of B provide a singular matrix, than B is reinitialized at step 206 to contain an outlying source vector, i.e. a vector that is far from what will ultimately be a code vector and control is returned to step 204. As one skilled in the art will recognize there are many methods to reinitialize matrix B so that it is not singular. The use of an outlier to reinitialize B is only a single example suggested by the inventors to resolve the problem of the matrix B being singular.

At step 208 matrix B is recalculated so that C (which is derived from B) provides a minimum distortion of the 64 source vectors in the 8×8 block. This is done by updating B based upon the formula:

$$B=SW^{T}*\text{inverse}(WNW^{T})$$

At step 210 it is determined if the values in B have converged, i.e. B now contains the locally optimal set of base codevectors that are used to derive the codevectors in codebook C. If this is not the case, the process repeats by returning to step 204.

Figure 5:
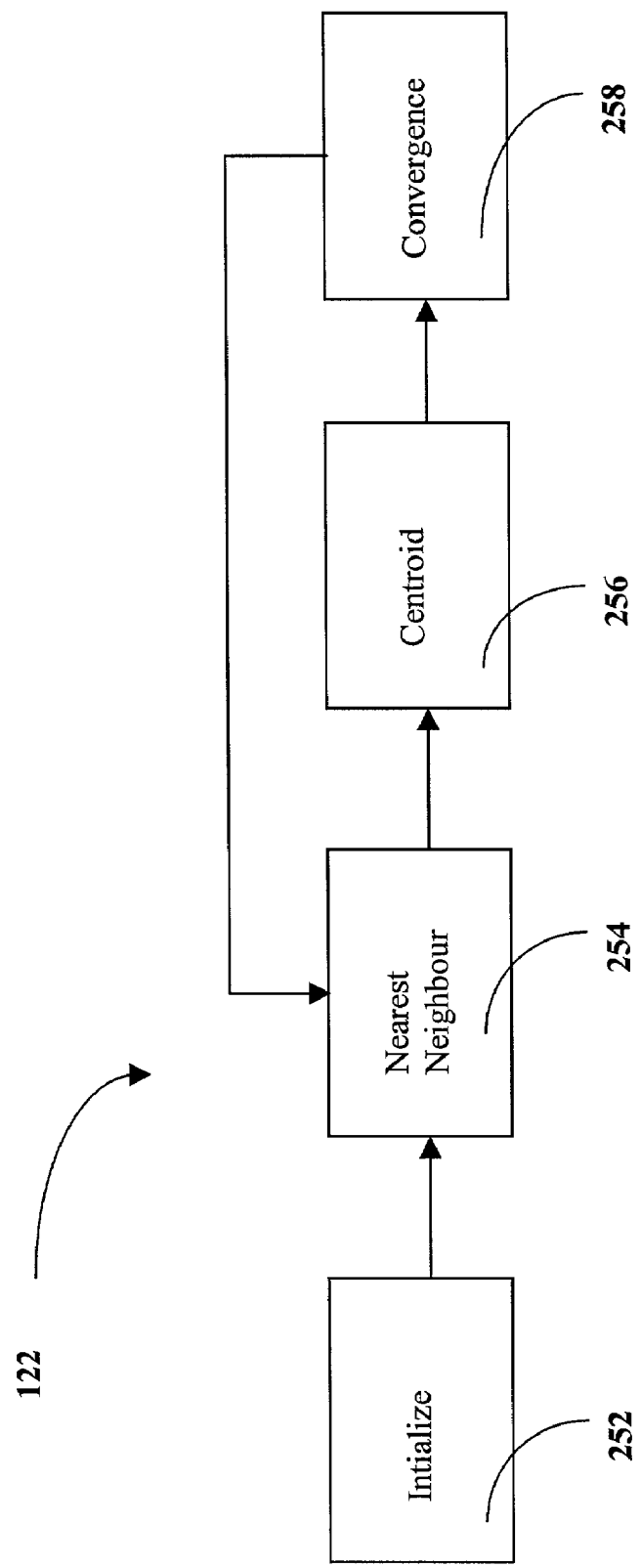
FIG. 5 is a block diagram of the components of the compression module.

To further illustrate the invention, we refer now to FIG. 5 a block diagram of the components of compression module 122 (see FIG. 3). Module 122 performs the functions illustrated in the flowchart of FIG. 4. Initialize module 252 randomly initializes matrix B, based upon the source vectors contained in the current block of data (i.e. the space 10 of FIG. 1). Nearest neighbour module 254 modifies matrix B so that each vector in B is a "nearest neighbour" to the source vectors and calculates matrix C. Centroid module 256 calculates the centroid of all the base vectors contained in B and corresponds to step 208 of FIG. 4. Convergence module 258 determines if the vectors in B have converged and if not, control is returned to nearest neighbour module 254.

In an alternate embodiment, system 100 is a video game platform or a PC with a graphics card supporting alternative conventional industry standard LCVQ-based texture compression methods.

In another alternate embodiment, the graphics engine 114 is non-conventional and supports 2D and 3D LCVQ formats.

It is not the intent of the inventor to limit the present invention to vector quantization for images. As one skilled in the art of signal compression will appreciate, the present invention has use in any area of signal compression or pattern recognition where linearly-constrained nearest neighbour techniques are used. The use of the present invention for vector compression of texture images is meant to be illustrative of one use. As an example of a use other than compression of video images, the present invention may be utilized in pattern recognition and in particular optical character recognition.

While the present invention minimizes mean squared error for LCVQ, the extension of the algorithm to minimize weighted mean squared error and other such commonly practiced modifications of the error criterion as considered from VQ in the present art, are considered by the inventor to be extensions to the present invention requiring only the transfer of VQ techniques to LCVQ as would be obvious to anyone skilled in the art.

Although the invention has been described with reference to certain specific embodiments, various modifications thereof will be apparent to those skilled in the art without departing from the spirit and scope of the invention as outlined in the claims appended hereto.

APPENDIX 1

```
%%%
function B = Initcluster(X,m)
% Get an initial base codebook B at random from input data
% INPUTS
% X = input data: each column is a RGB 'vector'
% m = number of base codevectors
% OUTPUTS
% B = base codevector matix
%need to duplicate some columns of B if X is small
[n,N] = size(X);
if(N > m)
    replace = 0;
else
    replace = 1;
end
%track what inputs put in B, so no duplication for X large
chosen = zeros(1,N);
B = zeros(n,m);
for i=1:m
    draw = floor(N*rand + 1);
    if(~replace)
        while(chosen(draw))
            draw = floor(N*rand + 1);
        end
    end
    B(:,i) = X(:,draw);
    chosen(draw) = 1;
end
%%%
function [B,Bq,d,iters,rd,nX] = lgbo(X,m,base)
% INPUTS
% X = input data: each column is a RGB 'vector'
% m = number of codevectors (columns in C)
% base = number of base codevectors (columns of B)
% OUTPUTS
% B = base codevector matrix
% Bq = quantized base codevector matrix
% d = distortion of X when replaced with chosen codevectors
% iters = # of iterations to reach convergence
[d,N] = size(X);  % d = dimension, N = blocksize
%random initialization
Init = initcluster(X,base);   % choose random initial set
if base==2     %1D (linear interpolation)
        W = [1:(-1/(m-1)):0; 0:(1/(m-1)):1]; %weight matrix
elseif base==3 %2D
        W=[1,0,0;0,1,0;.25,.25,.5;-.25,-.25,1.5; . . .
            1,-1,1;-1,1,1;0,-1,2;-1,0,2;]';
elseif base==4 %3D
        %W=[eye(4),.25*[2,2,1,-1;2,-1,2,1;1,2,-1,2;-1,1,2,2]];
        %W=[eye(4),.125*[3,2,2,1;2,3,2,1;3,1,2,2;1,2,3,2]];
end
%variable initialization
```

APPENDIX 1-continued

```
stoppingeps = 1.e-5;
vi = ones(1,m);
index=zeros(1,N);mind=index;
cumdist = Inf; lastdist = 0;
C= Init*W; %interpolate codevectors
# iterate until convergence
while(abs(cumdist - lastdist) > stoppingeps)
    lastdist = cumdist;
    cumdist = 0;
    iters=iters+1;
    while(1) %1 iteration that repeats if B goes singular
        % step (A)
        % form Voronoi regions: for each input,
            % determine which centroid it is closest to
            for i=1:N
                V=X(:,i(vi))-C;
                nm=sum(V.*V); %Euclidean distance squared (MSE)
                %input i's closest codevector
                [mind(i),index(i)]=min(nm);
            end
        cumdist = sum(mind);
%find diagonal matrix N
for j=1:m
        n(j) = sum(index==j);
end
% check if B is singular
% and force it to be non-singular
num=sum(n~=0);
if num<base %fewer than base non-zero!
    nz = find(n);
        if (base-num)==1 %base==2
    [jy,ji]=max(mind);
    Init(:,1:(base-1))=B(:,nz);
    Init(:,base)=X(:,ji);
    else
    [jy,ji]=sort(mind);
    Init(:,1:num)=B(:,nz);
    jl=N;
    for jk=(num+1):base
        Init(:,jk)=X(:,ji(jl));
        while(sum(abs(X(:,ji(jl))-X(:,ji(jl-1))))==0)
            jl=jl-1;
        end
        jl=jl-1;
    end % for jk
end % else
        C= Init*W; %start all over if hit a singular matrix
else
    break;
end % if not singular then end while loop
end %while(1)
s = zeros(d,m); %get sum matrix S
for j=1:m
        if n(j)==1
            s(:,j) = X(:,index==j);
        elseif n(j)
            s(:,j)= sum(X(:,index==j)')';
        end
end %for j=1:m
Init = s*W'*inv(W*diag(n)*W'); %new base codevector matrix B
C= Init*W; %new codevector matrix C
end %% while not converged
nX = B(:,index);    % save re-constructed block
d = cumdist;        % total block distortion
        end % function
```

I claim:

1. A method for compressing video data; said method comprising:

creating a codebook, comprising the steps of:
 a) initializing a base codebook B with a set of base codevectors,
 b) finding the nearest neighbour for each source vector in a block of data and associating said each source vector with a base codevector in said base codebook B,
 c) creating codebook C based upon the formula, C=B*W, wherein W is a weight matrix,
 d) updating base codebook B utilizing the following formula:

$$B = SW^T * \text{inverse}(WNW^T),$$

wherein S is a matrix where each column contains the sum of source vectors currently assigned to each base codevector in B and N is a diagonal matrix with the number of source vectors which are the closest to each base codevector in B appearing on the diagonal, and
 e) repeating steps b) to d) until the base codevectors in base codebook B have converged; and compressing the video data by converting a set of source vectors included in the video data into a set of indices related to the codevectors in the codebook C.

2. The method of claim 1, wherein at step a) said initializing comprises randomly selecting source vectors from said block of data, without replacement.

3. The method of claim 1 wherein if at step a), said base codebook B is singular, reinitializing said base codebook B.

4. The method of claim 3 wherein said reinitializing comprises selecting an outlying source code vector from within said block of data and inserting said outlying source code vector in said base codebook B.

5. A computer system for compressing video data, said system comprising:
 a) a general purpose computer;
 b) memory connected to said general purpose computer;
 c) a compression module resident in said memory b);
 wherein said compression module comprises;
  i) an initialization module for calculating initial values for a base codebook B, said initialization values comprising source vectors from a block of data;
  ii) a nearest neighbour module, said nearest neighbour module accepting said base codebook B as input from said initialization module and assigning each source vector in said data block to a vector in said base codebook B; and calculating a codebook C based upon the values in base codebook B;
  iii) a centroid module, said centroid module recalculating the values contained in base codebook B to improve convergence;
  iv) a convergence module, said convergence module determining if said centroid module has converged the values in said base codebook B; and
 d) a graphics engine connected to said compression module, said graphics engine configured to compress the video data by converting a set of source vectors included in the video data into a set of indices related to the codevectors in the codebook C.

6. The system of claim 5 wherein said initialization module initializes said base codebook B by randomly selecting source vectors from said block of data, without replacement.

7. The system of claim 6 wherein should said base codebook B, become singular, reinitializing said codebook B.

8. The system of claim 7 wherein said reinitialization comprises selecting an outlying source vector from said block of data.

9. The system of claim 5 wherein said nearest neighbour module creates codebook C by using the formula: C=B*W.

10. The system of claim 5 wherein said centroid module recalculates the values in base codebook B by using the formula:

$$B = SW^T * \text{inverses}(WNW^T),$$

wherein S is a matrix where each column contains the sum of source vectors currently assigned to each base codevector in B and N is a diagonal matrix with the number of source vectors which are the closest to each base codevector in B appearing on the diagonal.

11. The system of claim 5 wherein said convergence module returns control to said nearest neighbour module should the values in base codebook B not be converged.

12. A computer readable medium containing instructions for compressing video data; said instructions comprising:
   instructions for creating a codebook, comprising:
   a) instructions for initializing g a base codebook B;
   b) instructions for finding the nearest neighbour for each source vector in a block of data and associating said each source vector with a codevector in said base codebook B;
   c) instructions for creating a codebook C based upon the formula, $$C = B * W;$$

d) instructions for updating base codebook B utilizing the following formula:

$$B = SW^T * \text{inverse}(WNW^T),$$

wherein S is a matrix where each column contains the sum of source vectors currently assigned to each base codevector in B and N is a diagonal matrix with the number of source vectors which are the closest to each base codevector in B appearing on the diagonal; and
   e) instructions for repeating steps b) to d) until the values in base codebook B have converged,
   instructions for compressing the video data by converting a set of source vectors included in the video data into a set of indices related to the codevectors in the codebook C.

13. The medium of claim 12, wherein at step a) said initializing comprises randomly selecting source vectors from a block of data, without replacement.

14. The medium of claim 13 wherein if said base codebook B is singular, reinitializing said base codebook B.

15. The medium of claim 14 wherein said reinitializing comprises selecting an outlying source code vector from within said block of data and inserting said outlying source code vector in said base codebook B.

16. The system of claim 5 wherein said compression module provides one of 3D, 2D and 1D image data to said graphics engine.

17. The system of claim 16 wherein said 3D data comprises: four base codevectors, each comprising 16 bits, and sixty four, three bit indices.

18. The system of claim 16 wherein said 2D data comprises: three base codevectors, each comprising 21 bits, and sixty four, three bit indices.

19. The system of claim 16 wherein said 1D data comprises: two base codevectors, each comprising 16 bits and thirty two, 7 bit indices.

* * * * *